2,846,452

5(10) ESTRENE DERIVATIVES

J Allan Campbell, Kalamazoo Township, Kalamazoo County, and John C. Babcock, Portage Township, Kalamazoo County, Mich., assignors to The Upjohn Company, Kalamazoo, Mich., a corporation of Michigan No Drawing. Application September 6, 1955
Serial No. 532,736

6 Claims. (Cl. 260—397.4)

The present invention relates to certain steroid compounds and is more particularly concerned with novel 17β-hydroxy-5(10)-estren-3-one acylates.

The novel compounds of the present invention are represented by the following formula:

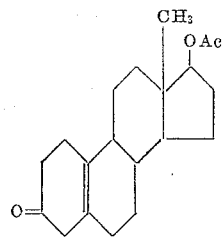

wherein Ac is the acyl radical of an organic carboxylic acid containing from one to eight carbon atoms, inclusive, and preferably the acyl radical of a hydrocarbon carboxylic acid containing from one to eight carbon atoms, inclusive.

The novel 17β-hydroxy-5(10)-estren-3-one acylates may be obtained by acylating in conventional manner the 17β-hydroxy-5(10)-estren-3-one or alternatively by hydrolyzing the corresponding 3-methoxy-2,5(10)-estradien-17β-ol acylate as shown in detail in the subsequent general description and in the examples.

It is an object of the present invention to provide the novel compounds 17β-hydroxy-5(10)-estren-3-one acylates wherein the acyl group is of organic carboxylic acid containing from one to eight carbon atoms, inclusive. A more specific object of the instant invention is to provide 17β-hydroxy-5(10)-estren-3-one acylates wherein the acyl group is of hydrocarbon carboxylic acid containing from one to eight carbon atoms, inclusive. Another object of the present invention is to provide the intermediate new esters, 3-methoxy-2,5(10)-estradien-17β-ol acylates wherein the acyl groups are defined as herein above as of organic carboxylic acids and more specifically of hydrocarbon carboxylic acids containing from one to eight carbon atoms, inclusive. Other objects of the invention will be apparent by one skilled in the art to which this invention pertains.

The 17β-hydroxy-5(10)-estren-3-one acylates of this invention have high anabolic and low androgenic activity. Of particular interest is the 17β-hydroxy-5(10)-estren-3-one 17β-acetate having oral anabolic activity which is six times that of the parent compound, 17β-hydroxy-5(10)-estren-3-one. The instant 5(10)-estren esters are also important intermediates in the production of other pharmaceutically active 19-normethyl steroids.

The starting materials for the instant invention are 17β-hydroxy-5(10)-estren-3-one [Birch, J. Chem. Soc. 367 (1950)] and the organic carboxylic acid esters containing from one to eight carbon atoms of 3-methoxy-2,5(10)-estradien-17β-ol prepared as shown in Preparations 1 through 3.

In carrying out the process of the present invention, 17β-hydroxy-5(10)-estren-3-one is admixed with an acylating agent such as, for example, ketene, a ketene of a selected acid, an acid such as formic acid, an acid chloride, an acid bromide, an acid anhydride or other known acylating agents wherein the corresponding acid is an organic carboxylic acid and in the preferred embodiment of the invention a hydrocarbon carboxylic acid having from one to eight carbon atoms, inclusive. Among the preferred acylating agents are the anhydrides of acetic, propionic, butyric, valeric, succinic, maleic and hexanoic acids, the chlorides or bromides of acetic, propionic, butyric, valeric, isovaleric, hexanoic, heptanoic, octanoic, benzoic, anisic, toluic, phenylaceticphenylpropionic, salicylic, nicotinic, piperonic, acid succinic acid tartaric, crotonic and the like. In the preferred embodiment of the instant invention, the solvent such as, for example, dioxane, pyridine, or other inert solvents such as benzene, toluene, ether, and the like are used and the reaction mixture is heated at a temperature between about zero degrees centigrade and the boiling point of the reaction mixture, usually about room temperature for a period between about one-half hour and about 96 hours. The time of reaction is somewhat dependent upon the temperature at which the reaction is carried out, the acylating agent, and the ratio of reactants. After the reaction is completed, the mixture is usually quenched in water or a mixture of ice and water and the product collected by filtration and purified in conventional manner, such as by recrystallization, chromatography, extraction or combinations thereof.

Alternatively 17β-hydroxy-5(10)-estren-3-one 17β-acylates may be produced by esterifying 3-methoxy-2,5(10) estradien-17β-ol by the conventional methods described before and shown in Preparations 1 through 3, to obtain the corresponding 3-methoxy-2,5(10)-estradien-17β-ol acylates and hydrolyzing this acylate by the method shown by Wilds et al., J. Am. Chem. Soc. 75, 5366 (1953), using oxalic acid or other mild organic acids, such as acetic, propionic or butyric acid in aqueous methyl alcohol solution. The enol ether is hydrolyzed to give a saturated 3-keto group while the ester group and the 5(10)-double bond is maintained.

The following preparations and examples will serve to illustrate the process and products of this invention, but the said invention is not to be considered as limited thereto.

PREPARATION 1

*3-methoxy-2,5(10)-estradien-17β-ol 17β-acetate*

To a solution of 2.4 grams of 3-methyl-2,5(10)-estradien-17β-ol in five milliliters of pyridine was added 1.5 milliliters of acetic anhydride. The solution was warmed to about sixty degrees centigrade for a period of about one and one-half hours and thereafter poured onto ice. The precipitate was collected on a filter and washed thoroughly with water, yielding 2.6 grams (92 percent) of 3-methoxy-2,5(10)-estradien-17β-ol 17β-acetate which when recrystallized from methanol had a melting point of 110 to 115 degrees centigrade and a rotation $[\alpha]_D$ +27 degrees (in chloroform).

*Analysis.*—Calcd. for $C_{21}H_{30}O_3$: C, 76.30; H, 9.15. Found: C, 76.08; H, 9.18.

PREPARATION 2

*3-methoxy-2,5(10)-estradien-17β-ol 17β-benzoate*

To a solution of 3-methoxy-2,5(10)-estradien-17β-ol in pyridine was aded an excess of benzoyl chloride. The solution was maintained at room temperature over a period of 16 hours and then poured into excess of water and ice. The precipitate was collected on a filter, thoroughly washed with water and recrystallized to give pure 3-methoxy-2,5(10)-estradien-17β-ol 17β-benzoate.

PREPARATION 3

3-methoxy-2,5(10)-estradien-17β-ol 17β-acylates

In the same manner as Preparations 1 and 2, inclusive, by reacting 3-methoxy-2,5(10)-estradien-17β-ol with a suitable organic carboxylic acid acylating agent or a hydrocarbon carboxylic acid acylating agent, other representative 3-methoxy-2,5(10)-estradien-17β-ol 17β-acylates are prepared such as illustratively: 3-methoxy-2,5(10)-estradien-17β-ol 17β-propionate, butyrate, isobutyrate, valerate, isovalerate, hexanoate, heptanoate, octanoate, β-cyclopentylpropionate, phenylacetate, phenylpropionate, o-, m-, p-toluate, cinnamate, gallate, salicylate, anisate, benzenesulfonate, para-chlorobenzenesulfonate, toluenesulfonate, benzenephosphonate, trimethylacetate, monochloroacetate, dichloroacetate, trichloroacetate, acid quinolinate, nicotinate, piperonate, ortho- or meta-chlorobenzoate, 2-furoate, para-nitrobenzoate, acid succinate, ortho-chloro-para-nitrobenzoate, acid tartrate, dihydrogen citrate, acid maleate, acid fumarate, thioglycollate, bromoacetate, crotonate, β-methylcrotonate, or the like.

EXAMPLE 1

17β-hydroxy-5(10)-estren-3-one 17β-acetate

A. From 3-methoxy-2,5(10)-estradien-17β-ol 17β-acetate.

To a solution of 1.5 grams of 3-methoxy-2,5(10)-estradiene-17β-ol 17β-acetate in 150 milliliters of methanol was added 2.3 grams of oxalic acid in twenty milliliters of water. During the addition the solution was kept cooled in a cold water bath. After maintaining at room temperature for a period of forty minutes, the reaction mixture was diluted with ether, extracted with water and sodium bicarbonate solution, dried over anhydrous magnesium sulfate, filtered and concentrated to dryness. The thus obtained residue was chromatographed through Florisil magnesium silicate in the following manner: two 100-milliliter fractions with Skellysolve B hexanes; two 150-milliliter Skellysolve B hexane fractions; one 100-milliliter Skellysolve B hexane fraction containing one-half percent of acetone; three 50-milliliter fractions of Skellysolve B hexanes containing one-half percent of acetone; five 50-milliliter fractions of Skellysolve B hexanes containing one percent acetone; three 50-milliliter and nine 100-milliliter fractions of Skellysolve B containing two percent acetone; three 100-milliliter fractions of Skellysolve B containing three percent acetone; five 100-milliliter fractions of Skellysolve B containing eight percent acetone; and three 100-milliliter fractions of Skellysolve B containing twelve percent acetone. Fractions 18 through 22 were combined, the solvent was removed and the residue recrystallized from ether pentane yielding 0.8 gram of 17β-hydroxy-5(10)-estren-3-one acetate of melting point 138 to 143 and rotation $[\alpha]_D$ +152 degrees in chloroform.

*Analysis.*—Calcd. for $C_{20}H_{28}O_3$: C, 75.91; H, 8.92. Found: C, 75.39, 74.95; H, 8.78, 8.46.

EXAMPLE 2

17β-hydroxy-5(10)-estren-3-one acetate from 17β-hydroxy-5(10)-estren-3-one

To a solution of 0.5 gram of 17β-hydroxy-5(10)-estren-3-one in ten milliliters of redistilled dioxane was added 0.5 milliliter of pyridine and 0.4 milliliter of acetic anhydride. The mixture was allowed to stand at room temperature (twenty to thirty degrees centigrade) for a period of six hours whereafter the reaction mixture was poured onto ice. The precipitate was collected, washed and dried over anhydrous sodium sulfate. The material thus obtained was recrystallized from Skellysolve B hexanes containing two percent acetone to give 0.1 gram of 17β-hydroxy-5(10)-estren-3-one 17β-acetate of melting point and physical constants equal to those shown in Example 1.

EXAMPLE 3

17β-hydroxy-5(10)-estren-3-one phenylpropionate

In the same manner as given in Example 1, 3-methoxy-2,5(10)-estradien-17β-ol phenylpropionate was hydrolyzed in aqueous methanol in the presence of oxalic acid to produce 17β-hydroxy-5(10)-estren-3-one phenylpropionate.

In a manner similar to Example 2, 17β-hydroxy-5(10)-estren-3-one phenylpropionate could be obtained by esterifying 17β-hydroxy-5(10)-estren-3-one with phenylpropionyl chloride.

EXAMPLE 4

17β-hydroxy-5(10)-estren-3-one propionate

In the manner given in Example 1, hydrolyzing 3-methoxy-2,5(10)-estradien-17β-ol propionate, dissolved in methanol in the presence of oxalic acid, yielded 17β-hydroxy-5(10)-estren-3-one propionate.

17β-hydroxy-5(10)-estren-3-one propionate is also obtained by esterifying in the manner given in Example 2 17β-hydroxy-5(10)-estren-3-one with propionic anhydride.

EXAMPLE 5

17β-hydroxy-5(10)-estren-3-one butyrate

In the manner given in Example 1, hydrolyzing 3-methoxy-2,5(10)-estradien-17β-ol butyrate, dissolved in methanol in the presence of oxalic acid, yielded 17β-hydroxy-5(10)-estren-3-one butyrate.

17β-hydroxy-5(10)-estren-3-one butyrate is also obtained by esterifying in the manner given in Example 2, 17β-hydroxy-5(10)-estren-3-one with butyric anhydride.

EXAMPLE 6

17β-hydroxy-5(10)-estren-3-one valerate

In the manner given in Example 1, hydrolyzing 3-methoxy-2,5(10)-estradien-17β-ol valerate dissolved in methanol in the presence of oxalic acid yielded 17β-hydroxy-5(10)-estren-3-one valerate.

17β-hydroxy-5(10)-estren-3-one valerate was also obtained by esterifying in the manner given in Example 2, 17β-hydroxy-5(10)-estren-3-one with valeric anhydride.

EXAMPLE 7

17β-hydroxy-5(10)-estren-3-one β-cyclopentylpropionate

In the manner given in Example 1, hydrolyzing 3-methoxy-2,5(10)-estradien-17β-ol β-cyclopentylpropionate, dissolved in methanol in the presence of oxalic acid, yielded 17β-hydroxy-5(10)-estren-3-one β-cyclopentylpropionate.

EXAMPLE 8

17β-hydroxy-5(10)-estren-3-one benzoate

In the manner given in Example 1, hydrolyzing 3-methoxy-2,5(10)-estradien-17β-ol benzoate, dissolved in methanol in the presence of oxalic acid, yielded 17β-hydroxy-5(10)-estren-3-one benzoate.

17β-hydroxy-5(10)-estren-3-one benzoate is also obtained by esterifying in the manner given in Example 2, 17β-hydroxy-5(10)-estren-3-one with benzoyl chloride.

EXAMPLE 9

17β-hydroxy-5(10)-estren-3-one phenylacetate

In the manner given in Example 1, hydrolyzing 3-methoxy-2,5(10)-estradien-17β-ol phenylacetate, dissolved in methanol in the presence of oxalic acid, yielded 17β-hydroxy-5(10)-estren-3-one phenylacetate.

EXAMPLE 10

17β-hydroxy-5(10)-estren-3-one 2-furoate

In the manner given in Example 1, hydrolyzing 3-methoxy-2,5(10)-estradien-17β-ol 2-furoate, dissolved in methanol in the presence of oxalic acid yielded 17β-hydroxy-5(10)-estren-3-one 2-furoate.

17β-hydroxy-5(10)-estren-3-one 2-furoate is also obtained by esterifying in the manner given in Example 2, 17β-hydroxy-5(10)-estren-3-one with 2-furoyl chloride.

EXAMPLE 11

*17β-hydroxy-5(10)-estren-3-one 17β-acylates*

In the same manner as given in Examples 1 through 10, other 17β-hydroxy-5(10)-estren-3-one 17β-acylates are obtained by hydrolyzing the corresponding 3-methoxy-2,5(10)-estradien-17β-ol acylates in aqueous alcoholic solutions in the presence of oxalic acid or by esterification of 17β-hydroxy-5(10)-estren-3-one with acid anhydrides or chlorides of organic carboxylic acids containing from one to eight carbon atoms. Among the 17β-acylates of 17β-hydroxy-5(10)-estren-3-ones thus obtained are: isobutyrate, isovalerate, hexanoate, heptanoate, octanoate, acid succinate, anisate, salicylate, the toluate, cinnamate, gallate, benzenesulfonate, para-chlorobenzenesulfonate, toluenesulfonate, benzenephosphonate, trimethylacetate, dichloroacetate, trichloroacetate, acid quinolinate, nicotinate, piperonate, acid tartrate, dihydrogencitrate, acid maleate, acid fumarate, crotonate, β-methylcrotonate, o-chlorobenzoate, p-nitrobenzoate, o-chloro-p-nitrobenzoate, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. 17β-hydroxy-5(10)-estren-3-one hydrocarbon carboxylic acid acylates of the formula:

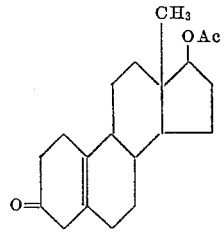

wherein Ac is an acyl radical of a hydrocarbon carboxylic acid containing from one to eight carbon atoms, inclusive.
2. 17β-hydroxy-5(10)-estren-3-one acetate.
3. 17β-hydroxy-5(10)-estren-3-one propionate.
4. 17β-hydroxy-5(10)-estren-3-one benzoate.
5. 17β-hydroxy-5(10) - estren-3-one β-cyclopentylpropionate.
6. 17β-hydroxy-5(10)-estren-3-one phenylacetate.

References Cited in the file of this patent
UNITED STATES PATENTS
2,109,400    Miescher _____ Feb. 22, 1938
OTHER REFERENCES
Birch: J. Chem. Soc. (London), 1949, 2531–6.

UNITED STATES PATENT OFFICE
CERTIFICATE OF CORRECTION

Patent No. 2,846,452                                  August 5, 1958

J Allan Campbell et al.

It is hereby certified that error appears in the printed specification of the above numbered patent requiring correction and that the said Letters Patent should read as corrected below.

Column 2, line 32, for "(10) estradien-" read -- (10)-estradien- --;

line 50, for "3-methyl-" read -- 3-methoxy- --.

Signed and sealed this 12th day of May 1959.

(SEAL)
Attest:

KARL H. AXLINE                                        ROBERT C. WATSON
Attesting Officer                                  Commissioner of Patents